S. S. MARVIN AND W. MUNZ.
CANDY AND CHOCOLATE MACHINE.
APPLICATION FILED NOV. 11, 1919.

1,385,462.

Patented July 26, 1921.
4 SHEETS—SHEET 1.

Inventors
Sylvester S. Marvin
and William Munz,
By Chas. N. Butler
Attorney.

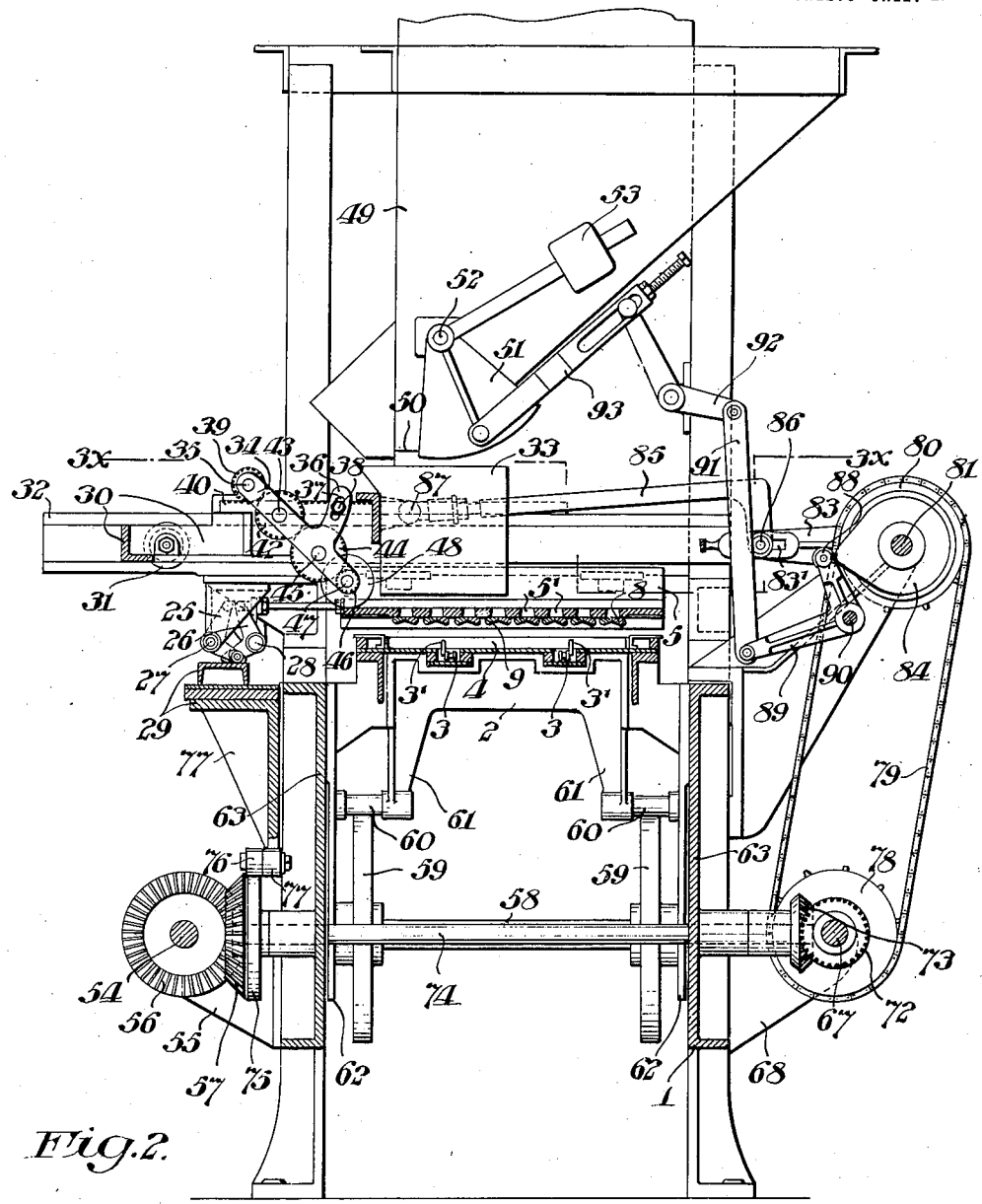
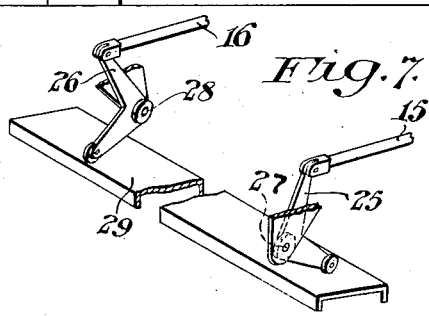

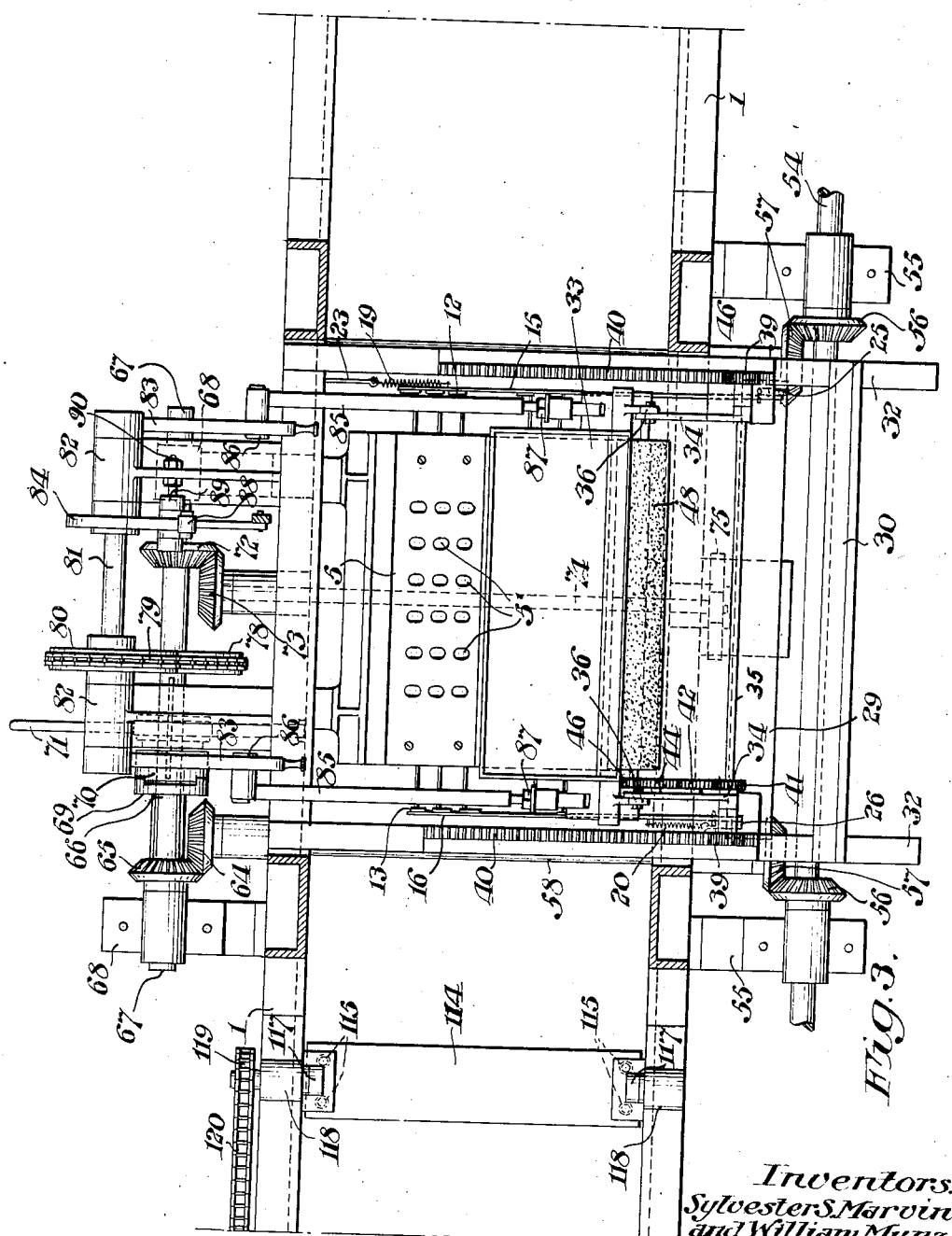

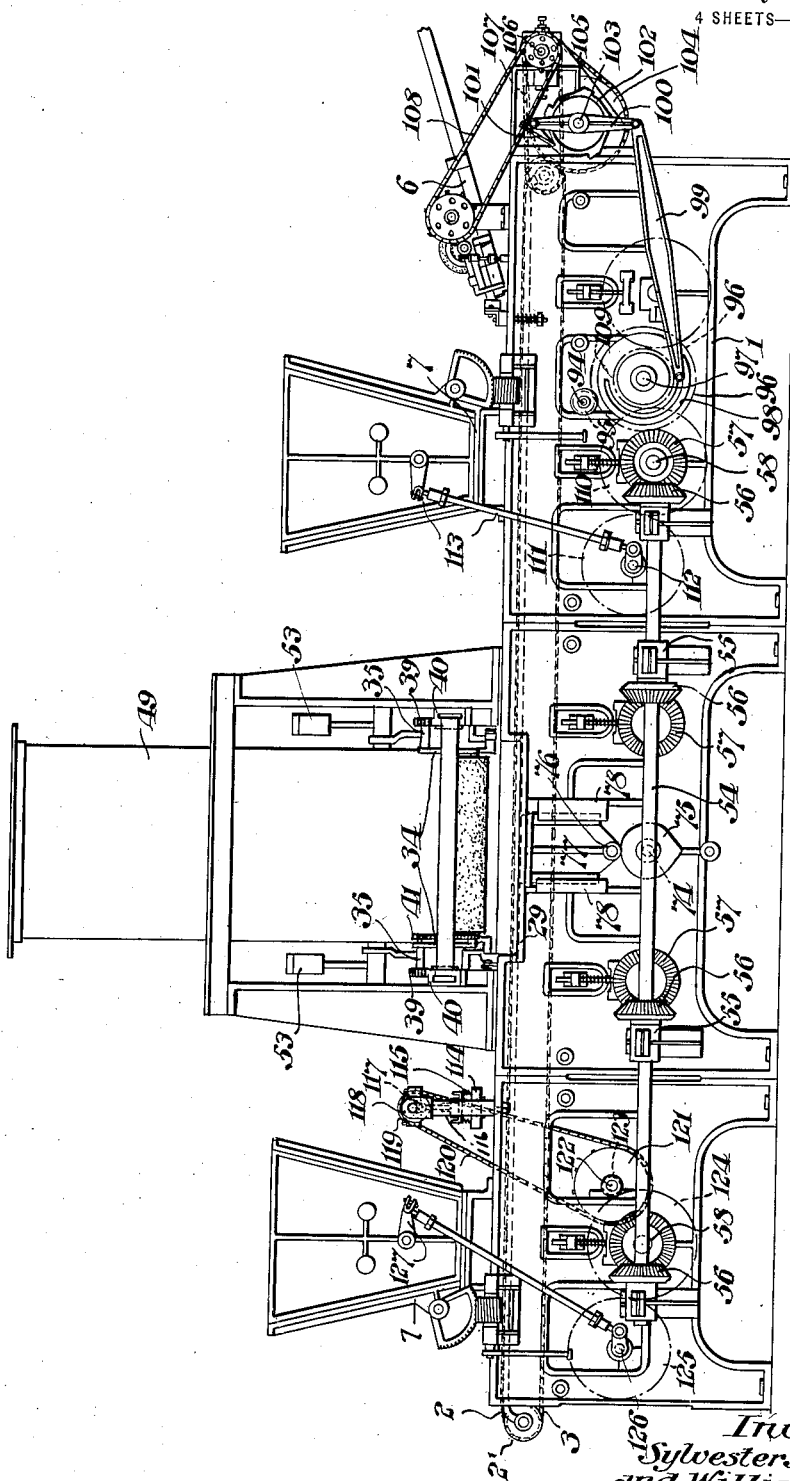

UNITED STATES PATENT OFFICE.

SYLVESTER S. MARVIN, OF BRYN MAWR, AND WILLIAM MUNZ, OF PHILADELPHIA, PENNSYLVANIA, ASSIGNORS TO PENNSYLVANIA CHOCOLATE COMPANY, OF PITTSBURGH, PENNSYLVANIA, A CORPORATION OF PENNSYLVANIA.

CANDY AND CHOCOLATE MACHINE.

1,385,462.     Specification of Letters Patent.     Patented July 26, 1921.

Application filed November 11, 1919. Serial No. 337,211.

*To all whom it may concern:*

Be it known that we, SYLVESTER S. MARVIN and WILLIAM MUNZ, citizens of the United States, and residents, respectively, of Bryn Mawr, in the county of Montgomery and State of Pennsylvania, and of Philadelphia, in the county of Philadelphia and State of Pennsylvania, have jointly invented certain Improvements in Candy and Chocolate Machines, of which the following is a specification.

This invention relates to improved mechanism for distributing and depositing nuts to be incorporated in candy or chocolate in the manufacture of various products as in the case of nut chocolate bars.

The improved mechanism is characterized by a main table upon which the deposits are combined, an auxiliary table containing apertures provided with shutters by which nuts are deposited in a predetermined manner to effect their incorporation with the product on the main table, means for delivering a measured quantity of the nuts to the auxiliary table from a source of supply, means for spreading the nuts over the auxiliary table so as to fill the closed apertures or chambers with the measured quantities which are required for the respective pieces of candy or chocolate, means for effecting the operation in synchronized relation so that the shutters shall be closed while the nuts are being distributed over the auxiliary table and the delivery of nuts to the auxiliary table shall be cut off while the shutters are open to permit the nuts in the apertures to be forced therefrom, and means for pressing the nuts into the plastic deposits on which they are dropped.

In practice, the improvements have been applied to the mechanism heretofore invented by us, in which a vertically movable table and an intermittently movable conveyer carry trays regularly fed thereto for holding deposits entering into the product, the table being elevated and the conveyer stationary while the trays carried thereby receive the deposits, first of plastic confection, then of nuts and then of further plastic confection.

The invention is embodied in the structure set out in the following description and the accompanying drawings in illustration thereof.

Figure 1:
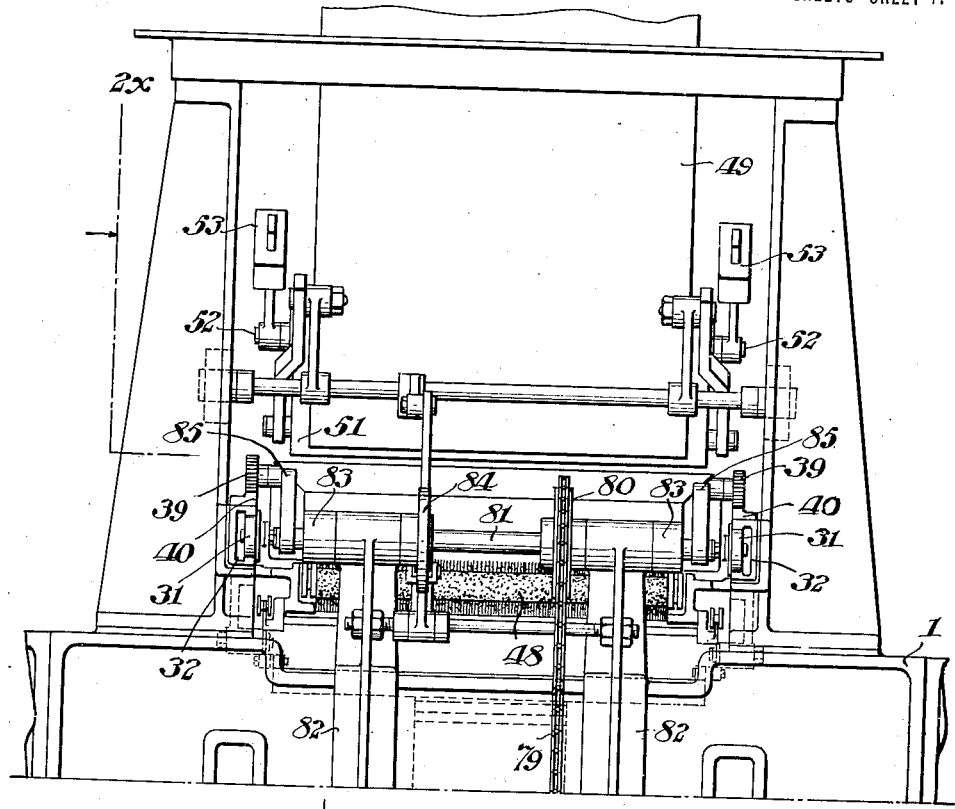
Figure 4:
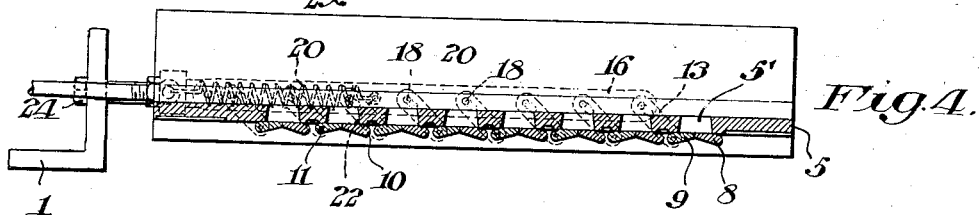
Figure 5:
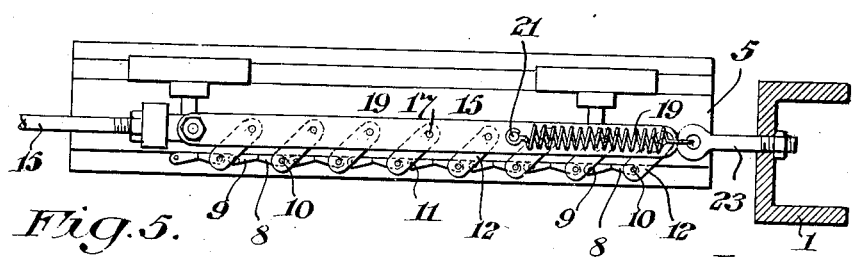

In the drawings, Figure 1 is a side elevation of a section of a machine embodying our invention; Fig. 2 is a sectional view taken on the line 2×—2× of Fig. 1; Fig. 3 is a sectional view taken on the line 3×—3× of Fig. 2; Fig. 4 is a transverse vertical sectional view through the auxiliary table, showing means for operating a set of shutters; Fig. 5 is a part sectional elevation of the auxiliary table and means for operating a complementary set of shutters; Fig. 6 is a side elevation of the assembled machine incorporating our improvements, and Fig. 7 is a fragmentary perspective view of shutter operating mechanism.

The machine shown in the drawings comprises a frame 1 which carries a bed or table 2, over the end rollers 2′ of which pass the link belts 3 having fingers 3′ for moving trays 4 intermittently over the table.

An auxiliary table 5 is supported by the frame 1 above the table 2 and is provided with the properly spaced apertures or compartments 5′. These compartments are of the size and form required for the predetermined quantities of nuts to be deposited upon respective deposits of chocolate or other plastic confection previously placed in registering positions upon the tray and thereunder; the trays being delivered to the table and conveyer by the feeding mechanism 6 and the plastic deposits placed thereon by the depositing mechanism 7.

Complementary shutters 8 and 9, which are carried by the respective hinges 10 and 11 journaled in the table 5, are adapted to close the bottoms of the apertures 5′, the shutters being rocked by the respective arms 12 and 13 fixed thereto. The arms 12 and 13 are oscillated by the respective bars 15 and 16 pivotally connected thereto, by the respective studs 17 and 18. Springs 19 and 20, connected with the respective bars 15 and 16 by the pins 21 and 22, are anchored by the adjustable bolts 23 and 24 to the frame 1 so as to move the bars simultaneously in opposite directions and hold the shutters 8 and 9 closed normally.

Oppositely disposed crank levers 25 and 26, provided with the respective horizontal fulcrums 27 and 28, have their upper arms connected with the respective bars 15 and 16 and their lower arms engaged by the vertically movable bearing 29. The levers 25 and 26 are rocked in opposite directions by the rise of the bearing 29 to move the bars 15 and 16 simultaneously in opposite directions (against the actions of the springs 21 and 22) and open the shutters 8 and 9, the shutters being closed by the springs when the bearing descends.

A carriage 30 is carried by rollers 31 in ways 32 which are supported by the frame and extends transversely to the machine above the table 5. The carriage 30 supports a hopper 33 which is over the table 5. Bearings 34, having the shaft 35 journaled therein, are provided with the lugs 36 containing the slots 37 through which pass bolts 38 fixed to the carriage 30, the shaft 35 being carried and revolved by the pinions 39 fixed thereon and engaging the racks 40 carried by the frame 1.

A pinion 41 fixed on the shaft 35 engages a pinion 42 journaled by means of a stub shaft 43 carried by a part 34; the pinion 42 engages a pinion 44 journaled by a stub shaft 45 carried by a part 34, and the pinion 44 drives a pinion 46 fixed on the shaft 47, which is journaled in the part 34 and carries a cylindrical brush or roller 48.

As the carriage 30 is reciprocated, the hopper 33 containing a measure of nuts is moved across the table 5 to deposit the nuts thereon, and is followed by the brush 48 which spreads the nuts over the table and fills the apertures 5', the brush being adjustable in elevation by means of the oscillatory bearings 34 and being revolved by the action of the racks 40 through the gear trains described.

A supply of nuts is delivered periodically to the hopper 33 from a magazine 49 through its outlet 50 under control of its valve 51, the latter rocking on bearings 52 and being closed normally by the weighted arms 53.

The nut depositing mechanism is operated to perform its several functions in coördinated relation from a longitudinal shaft 54, which is journaled in bearings 55 on a side of the frame 1, the shaft having fixed thereon the beveled gears 56. These gears engage and drive beveled gears 57 which are fixed on shafts 58 journaled in the frame, the shafts having the cams 59 fixed thereon. The cams 59 act on the rollers 60 impinging thereon and carried by the downwardly projecting table members 61 and 62, the latter moving in vertical ways 63 of the frame to guide the vertical reciprocations of the table 2.

A beveled gear 64, fixed on the third shaft 58 from the front end of the machine, engages a beveled gear 65 fixed on a sleeve 66, the latter being journaled on a shaft 67 which is journaled in the bearings 68 on a side of the frame. A clutch member 69 on the sleeve 66 is adapted to engage a clutch member or sleeve 70 splined on the shaft 67, a lever 71 fulcrumed on the frame 1 being connected with the member 70 to effect its engagement and disengagement with relation to the member 69.

The shaft 67 has fixed thereon a beveled gear 72 which engages and drives a beveled gear 73 fixed on the shaft 74. This shaft, which is journaled in the frame 1, has fixed thereon a cam 75 which engages a roller 76 on the strut 77, the latter reciprocating in the guides 78 and carrying the bearing 29 for rocking the cranks 25 and 26.

The shaft 67 has fixed thereon the sprocket wheel 78 which acts through the chain 79 on a sprocket wheel 80 fixed on the shaft 81, the latter being journaled in the bearings 82 on a side of the frame 1 and having fixed thereon the arms 83 and the cam 84.

The arms 83 are connected, through the slots 83' therein, with the bent links 85, which are provided with pivots 86 passing through the slots, and by pivots 87 with the connected carriage 30 and hopper 33. The carriage and hopper, together with the bearings 34 and the parts carried thereby, are thus reciprocated, in coördination with the actions of the shutters 8 and 9 under control of the cranks 25 and 26 connected therewith and with the common operating shaft 67 as described.

The cam 84 acts on a roller 88 carried by one arm of a crank 89, which has a fulcrum 90 carried by a bearing 82, the other end of the crank being connected by a link 91 with an arm or a crank 92. The latter crank is fulcrumed on the frame 1, and has an arm connected by the link 93 with the valve 51. This valve will, therefore, be oscillated by its connections with the shaft 81, in synchronous relation to the movements of the carriage 30 and the hopper 33, so that it will be opened to charge the hopper when thereunder, the valve being closed when the hopper moves across the table 5.

In the operation of the machine, a power shaft 94 carries a pinion 95 which drives a gear 96 on a journaled shaft 97, the latter carrying a disk 98. A link 99 connects the disk 98 with a lever 100 provided with a pawl 101 which gives a step by step movement to the ratchet 102 fixed on a shaft 103 journaled in the frame. A sprocket wheel 104 on the shaft 103 acts through a sprocket mechanism 105 to revolve the shaft 106, journaled in the frame, which acts through the sprocket mechanism 107 to give a step by step movement to the conveyers 3, and the sprocket mechanism 108 to operate the tray feeding mechanism 6 in synchronous relation. A gear wheel 109 on the shaft 97 drives a gear wheel 110 on the adjacent shaft 58 provided with the gear 57 which acts through the engaging gear 56 to drive the shaft 54. The gear 110 drives a gear 111 on a journaled shaft 112 which operates the mechanism 113 for feeding the first deposit of chocolate or other plastic confection to the trays 4 while stationary thereunder, the table 2 being elevated. As the successive trays, with the deposits of confection thereon, are carried forward by the conveyer mechanism under the auxiliary table 5, such deposits receive, while stationary, the deposits of nuts from the compartments 5' with which the confection deposits on the positioned tray now register, the shutters 8 and 9 opening to deposit the nuts.

The nuts having been deposited, the conveyer 4 carries the trays forward in succession under the head 114 which descends to press the nuts into the confection deposits.

The head 114 is connected, through a bed and springs 115, with links 116 which are reciprocated by a crank shaft 117 journaled in standards 118. The shaft 117 is revolved, by a sprocket wheel 119 thereon, through the action of a sprocket chain 120 which is driven by a sprocket wheel 121 on a journaled shaft 122, the latter being revolved by the engagement of a pinion 123 thereon with a gear 124 fixed on an adjacent shaft 58. The head 114 is thus operated in synchronized relation in the operation of the machine.

The gear 124 also acts through a gear 125 and the journaled shaft 126 on which it is fixed, to operate the mechanism 127 for effecting the synchronized final confection deposit on the nuts after they have been pressed down by the head 114 and when they are in stationary position under the final depositing mechanism 7.

Having described our invention, we claim:

1. In a machine of the character described, the combination with mechanism for feeding trays and mechanism for measuring and depositing a plastic material on said trays, of means for depositing nuts on said material and means for pressing said nuts into said material.

2. In a machine of the character described, the combination with mechanism for feeding trays and mechanism for depositing plastic material on said trays, of means for depositing nuts on said material, means for pressing said nuts into said material, and means for depositing plastic material on said nuts.

3. In a candy and chocolate machine, the combination of a table, and conveyer mechanism for carrying articles over said table, with depositing mechanism comprising a table containing apertures and shutters for opening and closing said apertures.

4. In a candy and chocolate machine, the combination of a vertically reciprocatory table, and conveyer mechanism for carrying articles over said table, with depositing mechanism containing apertures, shutters for controlling said apertures, and means for operating said reciprocatory table, conveyer mechanism and shutters in synchronous relation.

5. In a machine of the character described, the combination with a vertically reciprocatory table, conveyer mechanism for moving trays intermittently over said table, mechanism for depositing a plastic material on said trays, mechanism comprising a table provided with apertures and shutters for controlling said apertures for depositing nuts on said plastic material, and mechanism for operating said reciprocatory table, conveyer mechanism and shutters in synchronous relation.

6. In a machine of the character described, the combination of a table provided with apertures, oscillatory shutters for controlling said apertures, a device movable over said table for feeding materials thereto, a device for distributing materials over said table to said apertures, and means for operating said shutters and devices in synchronous relation.

7. In a candy and chocolate machine, the combination of a vertically reciprocatory table, a table provided with apertures disposed above said reciprocatory table, shutters for controlling said apertures and means whereby said reciprocatory table and shutters are operated in synchronous relation.

8. In a machine of the character described, the combination of a vertically reciprocatory table, a table provided with apertures disposed above said reciprocatory table, a pair of oppositely oscillatory shutters for controlling each of said apertures, and means for moving said reciprocatory table and shutters in synchronous relation.

9. In a machine of the character described, the combination with a table containing apertures, means for controlling said apertures, means movable across said table for distributing nuts thereto, and mechanism whereby said means first and second named are operated in synchronous relation.

10. In a machine of the character described, the combination with a main table and a conveyer movable over said table, of an auxiliary table containing apertures above said main table, valves for controlling said apertures, nut feeding means movable over said auxiliary table, and mechanism whereby said conveyer, valves and feeding means are operated in synchronous relation.

11. In a machine of the character described, the combination of a vertically reciprocatory table, an auxiliary table provided with apertures disposed above said reciprocatory table, oscillatory shutters pivotally connected with said auxiliary table for controlling said apertures, operating arms connected with the respective shutters, and means for rocking said arms.

12. In a machine of the character described, the combination with a vertically reciprocatory table, an auxiliary table provided with apertures above said reciprocatory table, oppositely oscillatory shutters pivotally connected with said auxiliary table for controlling said apertures, operating arms connected with the respective shutters, links connecting the respective sets of arms, and means comprising crank levers for operating said links simultaneously in opposite directions.

13. In a machine of the character described, the combination of a vertically reciprocatory table, an auxiliary table provided with apertures above said reciprocatory table, two sets of oppositely oscillatory shutters pivotally connected to said auxiliary table for closing the bottoms of said apertures, arms connected with the respective shutters, links connecting the respective sets of arms, means for operating said links to automatically close said shutters, and mechanism acting against said means for opening said shutters.

14. In a machine of the character described, mechanism comprising a table having apertures therein, valves for controlling said apertures, a nut feeding hopper movable across said table, nut distributing means movable with said hopper over said table, and mechanism for operating said valves, hopper and distributing means in synchronous relation.

15. In a machine of the character described, mechanism comprising a table, a way, a carriage movable along said way over said table, a hopper carried by said carriage, a revoluble brush carried by said carriage with said hopper, and means for revolving said brush.

16. In a machine of the character described, a table provided with apertures, valves for controlling said apertures, a stationary way, a stationary rack, a carriage movable along said way, a hopper carried by said carriage over said table, a revoluble brush carried by said carriage over said table, means comprising a gear engaging said rack for revolving said brush and mechanism for operating said valves and carriage in synchronous relation.

17. In a machine of the character described, a table provided with apertures, valves for controlling said apertures, nut feeding mechanism movable over said table, a nut magazine adapted for delivering to said feeding mechanism, a valve for controlling the delivery from said nut magazine, and mechanism for operating said valves and feeding mechanism in synchonous relation.

18. In mechanism of the character described, the combination of a table provided with apertures, valves for controlling said apertures, distributing mechanism movable over said table, a magazine adapted to deliver to said distributing mechanism, a valve for controlling the discharge from said magazine, a revoluble shaft, means whereby said shaft reciprocates said distributing mechanism and operates said magazine valve in synchronous relation, and means for operating said table valves and shaft in synchronous relation.

19. In mechanism of the class described, the combination of a table provided with shutters, a way, a carriage movable along said way, a device movable by said carriage over said table to deliver nuts thereover, a revoluble brush movable by said carriage over said table to distribute nuts delivered thereto, adjustable means for operating said brush at different elevations, a magazine for delivering nuts to said device, a valve for controlling the delivery from said magazine, a revoluble shaft, means whereby said shaft operates said carriage and valve in synchronous relation, and means whereby said shaft and shutters are operated in synchronous relation.

20. In mechanism of the class described, the combination of a reciprocatory table, an auxiliary table provided with apertures above said reciprocatory table, oppositely movable shutters for controlling each of said apertures, a carriage provided with a nut container and a brush movable over said auxiliary table, means comprising a revoluble shaft and a cam thereon for operating said shutters, means comprising a revoluble shaft and a cam thereon for reciprocating said carriage, and means whereby said table first named is reciprocated and said shafts are rotated in synchronous relation.

21. In a machine of the character described, the combination with a vertically reciprocating table and translating means movable over said table, of means for feeding trays to said translating means, means for depositing plastic confection on said trays, a table having apertures provided with valves for delivering nuts on said confection, means for depositing plastic confection upon said nuts, and mechanism for synchronously operating said reciprocating table, translating means, confection depositing means and valves.

22. In a machine of the character described, the combination with mechanism for feeding trays, of mechanism for depositing a plastic confection on said trays, mechanism for depositing nuts on said confection, a reciprocating mechanism comprising a head for pressing said nuts into said confection, mechanism for depositing plastic confection on said nuts, and mechanism for synchronously operating said feeding, depositing and pressing mechanisms.

23. In a machine of the character described, the combination of means for translating trays, means for delivering separate deposits of viscous material on the respective trays in succession, means for delivering separate deposits of solid material on said deposits first named, and means for delivering separate deposits of viscous material on said deposits of solid material.

24. In a machine of the character described, the combination of a vertically reciprocatory table, intermittently acting translating means movable over said table when lowered, means for delivering plates intermittently to said translating means, a hopper above said table, and means for measuring and delivering material from said hopper to said plates in the elevated position of said table.

25. In a machine of the character described, the combination of a vertically reciprocatory table, a carrier belt movable over said table, means above said table adapted for the passage of plates therefrom to said belt in the lower position of said table, and a hopper provided with means adapted for delivering measured amounts of chocolate to plates carried by said belt and in the elevated position of said table.

26. In a machine of the character described, the combination with mechanism for containing, measuring and depositing plastic material; mechanism for containing and depositing nuts; a second mechanism for containing, measuring and depositing plastic material, and mechanism whereby said mechanisms are operated in synchronous relation to effect said deposits successively in registration.

Signed at Philadelphia, in the county of Philadelphia, and State of Pennsylvania, this 10th day of November, 1919.

SYLVESTER S. MARVIN.
WILLIAM MUNZ.